United States Patent
Zukerman et al.

(10) Patent No.: US 10,805,207 B2
(45) Date of Patent: Oct. 13, 2020

(54) SYSTEM AND METHOD FOR DETERMINING AN OPTIMAL PATH ARRANGEMENT OF AN INFRASTRUCTURE LINK NETWORK

(71) Applicant: City University of Hong Kong, Kowloon (HK)

(72) Inventors: Moshe Zukerman, Kowloon (HK); Zengfu Wang, Shaanxi (CN); Qing Wang, Kowloon (HK); William Moran, Balwyn (AU)

(73) Assignee: City University of Hong Kong, Kowloon (HK)

( * ) Notice: Subject to any disclaimer, the term of this patent is extended or adjusted under 35 U.S.C. 154(b) by 13 days.

(21) Appl. No.: 16/265,337

(22) Filed: Feb. 1, 2019

(65) Prior Publication Data
US 2020/0252327 A1    Aug. 6, 2020

(51) Int. Cl.
| | | |
|---|---|---|
| *H04L 12/733* | (2013.01) | |
| *H04L 12/721* | (2013.01) | |
| *G06F 17/11* | (2006.01) | |
| *H04L 12/707* | (2013.01) | |
| *H04L 12/751* | (2013.01) | |

(52) U.S. Cl.
CPC ............ *H04L 45/126* (2013.01); *G06F 17/11* (2013.01); *H04L 45/02* (2013.01); *H04L 45/123* (2013.01); *H04L 45/22* (2013.01)

(58) Field of Classification Search
CPC ..... H04L 45/126; H04L 45/123; H04L 45/22; H04L 45/02; G06F 17/11
See application file for complete search history.

(56) References Cited

U.S. PATENT DOCUMENTS

| | | | | |
|---|---|---|---|---|
| 2005/0138578 A1* | 6/2005 | Alpert | ................... | G06F 30/394 716/114 |
| 2013/0096976 A1* | 4/2013 | Alpert | ................... | G06Q 10/06 705/7.23 |
| 2020/0105059 A1* | 4/2020 | Lukac | ................... | G06T 19/003 |

OTHER PUBLICATIONS

Z. Wang, et al, "Application of the Fast Marching Method for Path Planning of Long-haul Optical Fiber Cables With Shielding," IEEE Access, vol. 6, No. 1, pp. 41367-41378, Dec. 2018.

(Continued)

*Primary Examiner* — Michael A Keller
(74) *Attorney, Agent, or Firm* — Renner Kenner Greive Bobak Taylor & Weber

(57) ABSTRACT

A method for determining an optimal path arrangement of an infrastructure link network, and a related system for performing the method. The method includes modelling a geographic terrain having a plurality of geographic locations to be connected with each other via an infrastructure link network; modelling each of a laying cost and a repair rate as a respective function affecting the optimal path arrangement of the infrastructure link network; applying a respective weighting to each of the functions to determine a minimized cost function; and determining, based on the determined minimized cost function, the optimal path arrangement connecting the plurality of geographical locations. The determined optimal path arrangement of the infrastructure link network includes a trunk-and-branch topology with a plurality of infrastructure links and one or more connection points connecting the infrastructure links.

19 Claims, 10 Drawing Sheets

(56) References Cited

OTHER PUBLICATIONS

Z. Wang, et al, "A Seismic Resistant Design Algorithm for Laying and Shielding of Optical Fiber Cables," IEEE/OSA Journal of Lightwave Technology, vol. 35, No. 14, pp. 3060-3074, Jul. 2017.
Z. Wang, et al, "Multiobjective Path Optimization for Critical Infrastructure Links with Consideration to Seismic Resilience," Computer-Aided Civil and Infrastructure Engineering, vol. 32, No. 10, pp. 836-855, Oct. 2017.

* cited by examiner

SYSTEM AND METHOD FOR DETERMINING AN OPTIMAL PATH ARRANGEMENT OF AN INFRASTRUCTURE LINK NETWORK

TECHNICAL FIELD

The present invention relates to system and method for determining optimal path arrangement of an infrastructure link network. More particularly, although not exclusively, the invention relates to system and method for determining optimal paths network for laying submarine cables in trunk-and-branch topology.

BACKGROUND

Submarine cables, as a critical part of information communications technology infrastructure, play a crucial role in the transfer of information. It is estimated that these cables carry over 99% of global voice and data traffic, and the demand for them is expected to increase drastically in the future. However, the construction cost of submarine cables is generally very expensive.

Path planning, a procedure that involves selection of path for laying these submarine cables, is therefore an important procedure for constructing a submarine cable system. Ideally, the planning should take into account of cost as associated with material, labour, alternative protection levels, terrain slope and survivability of the cable, as well as the complexity of topology (such as earthquake prone areas, anchorage areas, fisheries, and areas with wind or underwater turbines etc.).

SUMMARY OF THE INVENTION

In the light of the foregoing background, it is an object of the invention to address the above needs, to overcome or substantially ameliorate the above disadvantages or, more generally, to provide system and method for determining an optimal path arrangement of an infrastructure link network.

Accordingly, the present invention, in a first aspect, provides a method for determining an optimal path arrangement of an infrastructure link network, comprising: modelling a geographic terrain having a plurality of geographic locations to be connected with each other via an infrastructure link network; modelling each of a laying cost and a repair rate as a respective function affecting the optimal path arrangement of the infrastructure link network; applying a respective weighting to each of the functions to determine a minimized cost function; and determining, based on the determined minimized cost function, the optimal path arrangement connecting the plurality of geographical locations, the determined optimal path arrangement of the infrastructure link network includes a trunk-and-branch topology with a plurality of infrastructure links and one or more connection points connecting the infrastructure links.

Preferably, the modelling of the geographic terrain comprises modelling the geographic terrain as an irregular two-dimensional (2D) manifold in three-dimensional (3D) Euclidean space.

Preferably, the determination step comprises formulating the optimal path arrangement with the trunk-and branch topology as a Steiner Minimal Tree (SMT) problem; and solving the SMT problem.

More preferably, the determination step comprises determining the number of the one or more connection points based on the minimized cost function.

Most preferably, the determination step comprises determining a location of the respective connection point based on the minimized cost function.

Preferably, the infrastructure link network comprises a submarine cable network, an oil pipeline network, a natural gas pipeline network, an optical cable network, or an electrical power cable network.

Preferably, each of the one or more connection points corresponds to a location of a branching unit of a cable or of a cable landing station of a cable network.

Preferably, the determination of the optimal path arrangement comprises solving the following optimisation equation:

$$\min_{X,\Gamma} \Psi(X, \Gamma) = \sum_{(i,j) \in E_1} c(x_i, x_j) + \sum_{(i,j) \in E_2} c(x_i, x_j).$$

such that a total cost of the infrastructure link network corresponding to $\Gamma$ is minimised; where $\Gamma$ denotes an adjacency relationship between the one or more connection points; $x_i$ and $x_j$ denote two connection points of the infrastructure link.

Additionally, the determination of the optimal path arrangement may further comprise transforming the optimization equation to a Bellman equation; and applying fast marching method to solve the transformed equation for determination of the optimal path arrangement.

In accordance with a second aspect of the invention, there is provided a non-transitory computer readable medium for storing computer instructions that, when executed by one or more processors, causes the one or more processors to perform a method for determining an optimal path arrangement of an infrastructure link network, comprising: modelling a geographic terrain having a plurality of geographic locations to be connected with each other via an infrastructure link network; modelling each of a laying cost and a repair rate as a respective function affecting the optimal path arrangement of the infrastructure link network; applying a respective weighting to each of the functions to determine a minimized cost function; and determining, based on the determined minimized cost function, the optimal path arrangement connecting the plurality of geographical locations, the determined optimal path arrangement of the infrastructure link network includes a trunk-and-branch topology with a plurality of infrastructure links and one or more connection points connecting the infrastructure links.

Preferably, the modelling of the geographic terrain comprises modelling the geographic terrain as an irregular two-dimensional (2D) manifold in three-dimensional (3D) Euclidean space.

Preferably, the determination step comprises formulating the optimal path arrangement with the trunk-and branch topology as a Steiner Minimal Tree (SMT) problem; and solving the SMT problem.

More preferably, the determination step comprises determining number of the one or more connection points based on the minimized cost function.

Most preferably, the determination step comprises determining a location of the respective connection point based on the minimized cost function.

Preferably, the infrastructure link network comprises a submarine cable network, oil pipeline network, a natural gas pipeline network, an optical cable network, or an electrical power cable network.

Preferably, each of the one or more connection points corresponds to a location of a branching unit of a cable or of a cable landing station of a cable network.

Preferably, the determination of the optimal path arrangement comprises solving the following optimisation equation:

$$\min_{X,\Gamma} \Psi(X, \Gamma) = \sum_{(i,j) \in E_1} c(x_i, x_j) + \sum_{(i,j) \in E_2} c(x_i, x_j).$$

such that a total cost of the infrastructure link network corresponding to $\Gamma$ is minimised; where $\Gamma$ denotes an adjacency relationship between the one or more connection points; $x_i$ and $x_j$ denote two connection points of the infrastructure link.

Additionally, determination of the optimal path arrangement further comprises transforming the optimization equation to a Bellman equation; and applying fast marching method to solve the transformed equation for determination of the optimal path arrangement.

In accordance with a third aspect of the invention, there is provided an information handling system, comprising one or more processors arranged to: model a geographic terrain having a plurality of geographic locations to be connected with each other via an infrastructure link network; model each of a laying cost and a repair rate as a respective function affecting the optimal path arrangement of the infrastructure link network; apply a respective weighting to each of the functions to determine a minimized cost function; and determine, based on the determined minimized cost function, the optimal path arrangement connecting the plurality of geographical locations, the determined optimal path arrangement of the infrastructure link network includes a trunk-and-branch topology with a plurality of infrastructure links and one or more connection points connecting the infrastructure links Preferably, the information handling system also includes a display, operably connected with the one or more processors, arranged to display the determined optimal path arrangement.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

The invention relates to optimal path planning for an infrastructure link network on the Earth's surface, taking into account large scale real landforms with mountains and valleys, etc. Conventional approach only considers point-to-point path planning and a raster graphic approach to obtain the least cumulative cost path. However, one weakness of such approach is that the path is limited in using only lateral or diagonal links when moving from one cell to an adjacent cell.

The present invention considers optimal path design for infrastructure link network, such as cable systems, with trunk-and-branch topology on the surface of the Earth. In cable systems, a branching unit is a piece of equipment used for splitting a cable, such splitting is needed if a cable is required to serve multiple destinations including, for example, a landing site.

In one embodiment, the focus is on path optimization of infrastructure link network, such as undersea cable network, long-haul oil/gas/water pipeline network, optical cable network, or electrical power cable network. Preferably, the problem can be formulated as a Steiner Minimal Tree (SMT) problem on an irregular two-dimensional (2D) manifold in three-dimensional (3D) Euclidean space, and more preferably, where the edges of the SMT are minimum cost geodesics.

Figure 1:
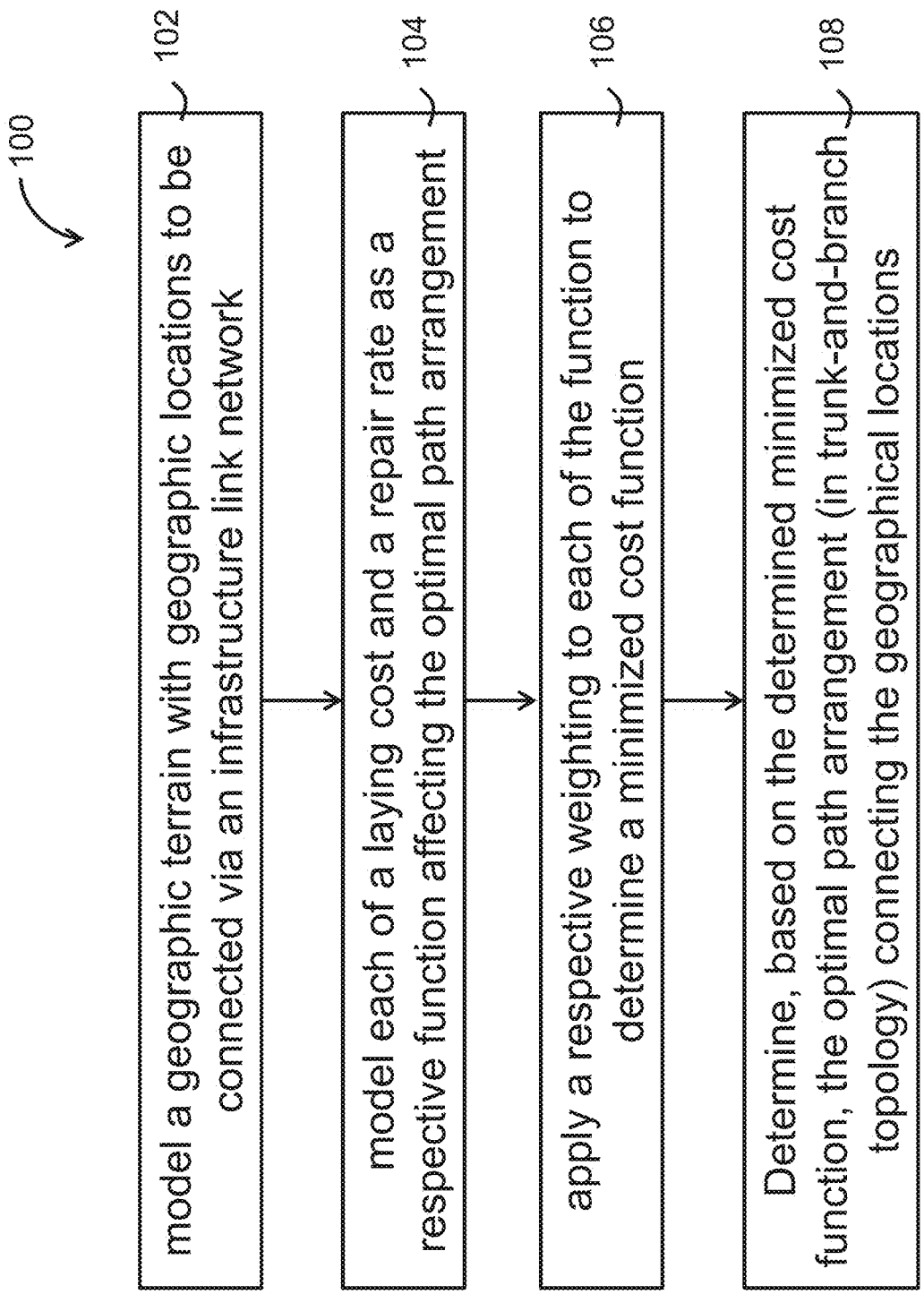
FIG. 1 a flow diagram illustrating a method for determining an optimal path arrangement of an infrastructure link network in one embodiment of the invention.

FIG. 1 shows a method 100 for determining an optimal path arrangement for an infrastructure link network to be arranged between a plurality of geographic locations. The method 100 comprises a step 102 of modelling a geographic terrain having a plurality of geographic locations to be connected with each other via an infrastructure link network. The geographic terrain in the present embodiment is modelled as an irregular two-dimensional (2D) manifold in three-dimensional (3D) Euclidean space.

The method 100 further comprises a step 104 of modelling a laying cost and a repair rate each as a function affecting the optimal path arrangement. In this embodiment, laying cost and repair rate are each considered as a function affecting the total cost of the infrastructure link network. The laying cost function takes into account one or more of the material, labour, alternative protection levels, terrain slope. The repair rate function considers, e.g., the survivability of the cable, which includes the risk of future cable break associated with laying the cable through sensitive and risky areas, such as, in particular, earthquake prone regions.

The method 100 further comprises a step 106 of applying a respective weighting to each of the functions to determine a minimized cost function, and a step 108 of determining, based on the determined minimized cost function, the optimal path arrangement connecting the plurality of geographical locations. The determined optimal path arrangement of the infrastructure link network would include a trunk-and-branch topology with a plurality of infrastructure links and one or more connection points connecting the infrastructure links. The goal of an infrastructure link network with trunk-and-branch topology is to find the connecting network that may use extra nodes, called Steiner nodes with the minimal total cost, which can be obtained from the minimized cost function. Such a minimum cost network is formulated as an SMT to determine the number of connection points to be cooperated in the optimal path arrangement, and the location of each of the connection points. Each of the connection points is a branching unit of a cable or a cable landing station of a cable network.

Modelling

Models are for designing the optimal path arrangement for the infrastructure link network. Three models are described below, which will then be formulated as a Steiner Minimal Tree (SMT) problem.

Let D denote a closed and bounded path-connected region on the Earth's surface. Given n nodes $x_1, x_2, \ldots, x_n$ on D (called terminals) to be connected in a cable network with trunk-and-branch topology, we aim to find the connecting network, that may use extra nodes, called Steiner nodes, with minimal total cost (weighted sum of the laying cost and the repair rate). Such a minimum cost function will be formulated as a SMT problem, to determine the number of Steiner nodes to be used, the location of the Steiner nodes, and finally the edges of the tree (geodesics). $\gamma \in D$ (geodesic) is used to denote a cable connecting two end nodes A, B∈D. Curves in D are assumed parameterized according to the natural parametrization, i.e., parameterizing a curve $\gamma$ as a function of arc length denoted by s, so that a curve $\gamma$: [0, $I(\gamma)$]→D is a function from the interval [0, $I(\gamma)$], taking values in D, where $I(\gamma)$ is the length of the curve $\gamma$. This apparently circuitous definition turns out not to be a problem in practice because of the method used to find such curves.

The models of landforms, cable laying cost, and the number of potential required repairs are first described. Then, optimal path design for submarine cable systems with trunk-and-branch topology is formulated as a SMT problem on an irregular 2D manifold in 3D Euclidean space $R^3$. It should be emphasized that the edges of the SMT here are minimal cost geodesics in D rather than straight lines, significantly adding to the computational complexity of the problem. The overall cost of the SMT, the sum of the costs of all the edges of the SMT, represents the total cost of all the cables in the cable network with trunk-and-branch topology.

A. Earth's Surface Model

To accurately represent the Earth's surface, a triangulated piecewise-linear 2D manifold M in $R^3$ is used to approximate the region D. Each node X on M is represented by 3D coordinates (x, y, z), where $z=\xi(x, y)$ is the altitude of the geographic location (x, y).

B. Laying Cost Model

For any node $x=(x, y, z) \in M$, $z=\xi(x, y)$, h(x) is used to represent the laying cost per unit length. The laying cost of submarine cables is related to many factors, including the local site attributes (soil type, elevation, etc.), labour, licenses (e.g. right of way), protection level and the direction of the path. For a cable represented by a Lipschitz continuous curve $\gamma$ connecting two nodes A and B in M, the total laying cost of the cable $\gamma$ is represented by H ($\gamma$). Applying the additive assumption of the laying cost, H ($\gamma$) can be written as $$H(\gamma) = \int_0^{l(\gamma)} h(\gamma(s))ds. \quad (1)$$

C. Cable Repair Model

The repair rate at location $x=(x, y, z) \in M$, $z=\xi(x, y)$ is defined as g(x). We assume that the repair rate function g(x) is also continuous. Let G($\gamma$) denote the total number of repairs of a cable $\gamma$. Again, we assume that G ($\gamma$) is additive. That is, G($\gamma$) can be rewritten as $$G(\gamma) = \int_0^{l(\gamma)} g(\gamma(s))ds. \quad (2)$$

Ground motion intensities, such as Peak Ground Velocity (PGV), are used to calculate the repair rate g taking into consideration the risk caused by earthquakes. Other natural hazards (e.g. landslides, debris flows, volcanoes, storms, hurricanes) that may damage cables can be dealt with in the same way using the laying cost model and cable repair model provided that they are local and additive in nature.

Problem Formulation and Solution

To consider both the laying cost and the breakage risk in cable path planning, a weighted sum approach is used. Specifically, for any node $x=(x, y, z) \in M$, $z=\xi(x, y)$, let $f(x)=\alpha \cdot h(x)+g(x)$ be a weighted cost at x, where $\alpha \in R_+^1 \cup \{0\}$ can be regarded as the exchange rate between the laying cost and the risk. Then the total cost of a cable $\gamma$ is $$c(\gamma) = \int_0^{l(\gamma)} f(\gamma(s))ds. \quad (3)$$

Based on the models of landforms, laying cost and cable repair and Equation (3), the problem of path design for submarine cable systems with trunk-and-branch topology is restated as follows. Given n terminals $x_1, x_2, \ldots, x_n$ on the 2D triangulated manifold M in $R^3$ to be connected as a network, find the Steiner tree with minimal weighted cost.

The formulated SMT problem on the 2D triangulated manifold M in $R^3$ is clearly NP-Hard since it generalizes the SMT problem in Euclidean plane. Some Steiner tree terminologies are introduced here for better clarity. By the topology of a tree, its combinatorial structure is being referred to; that is, a specification of which pairs of terminals/Steiner nodes are connected by an edge. The topology specifies connections but not positions of nodes. Note that there are at most n−2 Steiner nodes in the SMT with n terminals. A topology with n terminals and m Steiner nodes (0≤m≤n−2) is a Steiner topology if the degree of each Steiner node is equal to three and the degree of each terminal is three or less. A Steiner topology for n terminals is called a full Steiner topology (FST) if it has exactly n−2 Steiner nodes and each terminal has degree one; otherwise, it is called a nonfull Steiner topology. The minimum cost tree for a given Steiner topology Γ is called a Relatively Minimal Tree (RMT) for Γ, and is unique. A tree with n location-specified terminals in a Euclidean space is a Steiner tree with the following properties:

There are at most n−2 Steiner nodes in the tree;

Degree condition: all the terminals will be of degree one, two, or three and the Steiner nodes are all of degree three;

Angle condition: any two edges meet at an angle of at least 120°

The corresponding SMT is the Steiner tree with minimal cost. A Steiner tree is always a RMT for its topology, but not vice versa. A RMT is a Steiner tree if all of its angles are 120° or more. A Steiner tree with n terminals is a full Steiner tree if it has n−2 Steiner nodes and each terminal has degree one. Any Steiner tree can be concatenated by smaller full Steiner trees. A Steiner tree is called degenerate if the costs of some edges are zero. Accordingly, the nonfull Steiner topologies are degenerate FSTs. For any SMT with a nonfull Steiner topology, an FST that corresponds to this nonfull Steiner topology can always be found such that the RMT for the FST is degenerate. Therefore, we only need to focus on FST. Denote the Steiner nodes by $x_{n+1}, x_{n+2}, \ldots, x_{2n-2}$.

These properties have been used to develop fast algorithms for finding the SMT in n-dimensional Euclidean space. For example, the GeoSteiner algorithm, a commonly used algorithm for the SMT problem in Euclidean plane, uses geometrical properties (including the degree condition, the angle condition etc.) to discover the nonexistence or the nonoptimality of a full Steiner tree for a given full topology. The planar FST concatenation heuristics of the GeoSteiner algorithm heavily utilize planar geometry, and these do not readily generalize to higher dimensions and irregular 2D manifolds in $R^3$. Smith's branch-and-bound B&B algorithm consists of the tree generation step and the numerical optimization step. In the numerical optimization step, a linear equation system is established by interpreting a Steiner tree as a mechanical system. An iteration method is used to solve the linear equation system numerically. Thus far, no efficient numerical method is known for the SMT problem in a 2D triangulated manifold M in $R^3$.

To solve the formulated SMT problem on a 2D triangulated manifold M in $R^3$, an implicit enumeration scheme, the B&B algorithm is adopted to enumerate the Steiner topologies. For a topology to be expanded (i.e., a Steiner topology), a noniterative algorithm is used to find the RMT for the topology. Next, a proposed algorithm for finding the RMT for a known topology is introduced and a computational complexity analysis of the proposed algorithm, followed by a description of techniques that reduce the computational cost. Lastly, the B&B algorithm is incorporated.

A. RMT for a Known Topology

A non-iterative numerical algorithm is used to optimally find the coordinates of the Steiner nodes for any pre-specified Steiner topology r. Note that r is not necessarily full or nondegenerate. It is assumed that in r there exists at least one Steiner node, all terminals are of degree one and r is connected. If there is no Steiner node, the problem becomes a minimum spanning tree problem (MST), and can be solved by running FMM and Kruskal's MST algorithm. Note that, for n terminals to be connected, the cost of the MST provides an upper bound for the cost of SMT.

In order to more precisely describe the problem, let $N=\{1, 2, \ldots, n\}$ be the set of indices associated with the given terminals $x_1, x_2, \ldots, x_n \in M$ and $S=\{n+1, n+2, \ldots, n+m\}$, $m \leq n-2$ be the set of the indices associated with additional Steiner nodes $x_{n+1}, x_{n+2}, \ldots, x_{n+m} \in M$. Recall that the coordinates of all terminals are given but those of Steiner nodes are not. It is imposed that all terminals are the grid nodes of M. This is a fairly natural assumption; after all only the coordinates of grid nodes of M are given in practice. Note that $\Gamma$ describes the adjacency relationship between the nodes: $\Gamma$ describe a graph (more precisely, tree) abstractly. Let $V=N \cup S$ and $E=E_1 \cup E_2$ be the set of all nodes and edges, respectively, i.e., $\Gamma=(V, E)$, where $E_1=\{(i, j)|i \in N, j \in S\}$ and $E_2=\{(i, j)|i \in S, j \in S\}$.

Figure 2:
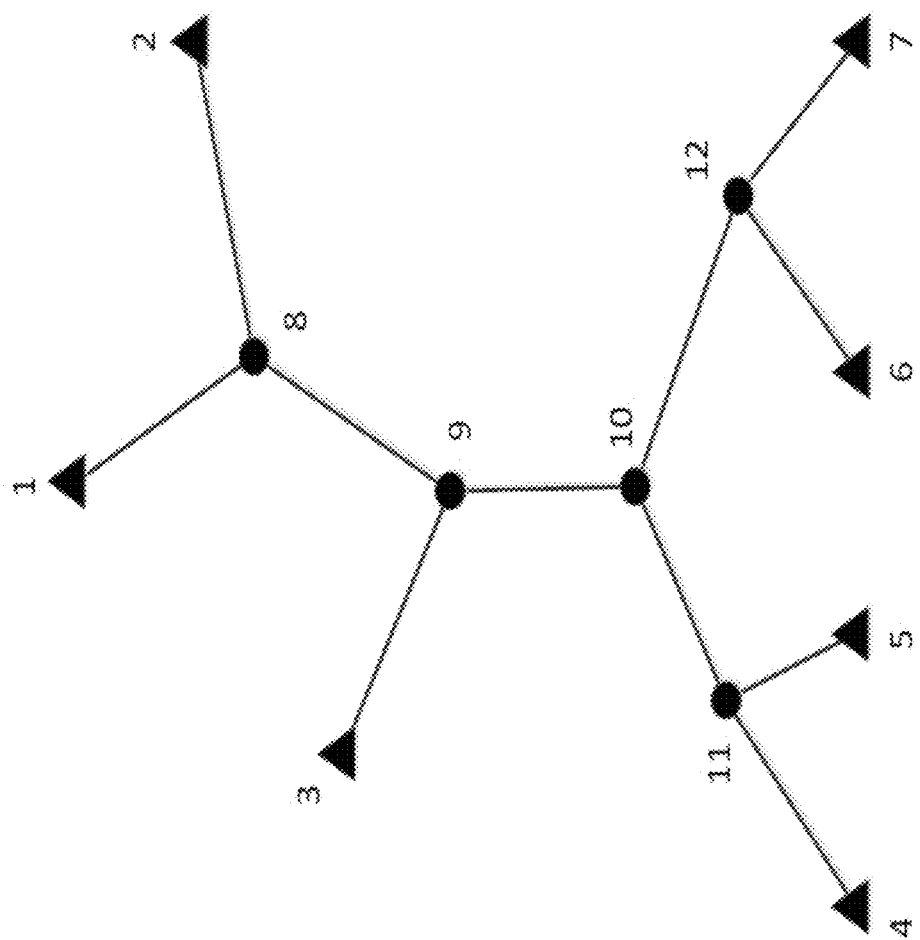
FIG. 2 is an illustration of a full Steiner topology.

FIG. 2 shows an example of a Steiner topology with seven terminals and five Steiner nodes. The triangles represent terminals and the circles represent Steiner nodes. The coordinates of terminals are known but those of Steiner nodes are not.

For a cable $\gamma_{ij}$ that connects two nodes $x_i \in M$ and $x_j \in M$, let $$c(x_i, x_j) = \int_{xi}^{xj} f(x(s)) ds$$

denote the cumulative weighted cost (Hereafter cost is used for brevity) over the cable path $\gamma_{ij}$. Note that the cable is not required to traverse edges of triangles of M. More practical and better solutions can be obtained if we assume that the cable can pass through the interior of triangles of M. Given the graph $\Gamma$ and the coordinates of all terminals, our aims are therefore to find coordinates $X=\{x_{n+1}, x_{n+2}, \ldots, x_{n+m}\}$, $x_{n+j} \in M$, $j=1, 2, \ldots, m$ and the paths $\Gamma=\{\gamma(e)|e \in E\}$ (i.e., the geodesics corresponding to the edges in E) such that the total cost of the physical cable network corresponding to $\Gamma$ is minimized, that is, $$\min_{X,\Gamma} \Psi(X, \Gamma) = \sum_{(i,j) \in E_1} c(x_i, x_j) + \sum_{(i,j) \in E_2} c(x_i, x_j). \quad (4)$$

If the coordinates of Steiner nodes were known, then the Problem in (4) above would reduce to a set of least-cost path problems, each of which is to find a least cost path connecting two known nodes on M. Accordingly, one way to solve Problem (4) is to enumerate all the combinations of the coordinates of the Steiner nodes and then find all the paths. This is infeasible in practice since there are a large number of nodes in M.

Equation 4 can be rewritten as:

$$\min_{X,\Gamma} \Psi(X, \Gamma) = \min_{X}\left(\sum_{(i,j) \in E_1} \min_{\gamma_{ij}} c(x_i, x_j) + \sum_{(i,j) \in E_2} \min_{\gamma_{ij}} c(x_i, x_j)\right) \quad (5)$$

$$= \min_{X}\left(\sum_{j \in S} \sum_{\substack{i \in N \\ (i,j) \in E_1}} \min_{\gamma_{ij}} c(x_i, x_j) + \sum_{(i,j) \in E_2} \min_{\gamma_{ij}} c(x_i, x_j)\right)$$

$$= \min_{X}\left(\sum_{j \in S} \bar{c}(x_j) + \sum_{(i,j) \in E_2} \min_{\gamma_{ij}} c(x_i, x_j)\right),$$

where $\bar{c}(x_j)=\Sigma_{i \in N,(i,j) \in E_1} \min \gamma_{ij} c(x_i, x_j)$ is the sum of the minimum cost from each terminal adjacent to $x_j$ to $x_j$, which can be solved by applying FMM with the terminal being the source node. Let $\bar{c}(x_j)=0$ if no terminal is adjacent to the Steiner node $x_j$.

Let's call subgraph $T=(S, E_2)$, the subtree composed of only Steiner nodes and the edges connect them, the skeleton tree of the graph $\Gamma$. The skeleton tree T can be viewed as the tree where the terminals shrink to their connected Steiner node. Note that, for now, only the topology of the skeleton tree T is known. An arbitrary node $r \in T$ is chosen as the root of the tree T and then assign the edges of T an orientation towards the root. As a result, T becomes a directed rooted tree (i.e., anti-arborescence).

Figure 3:
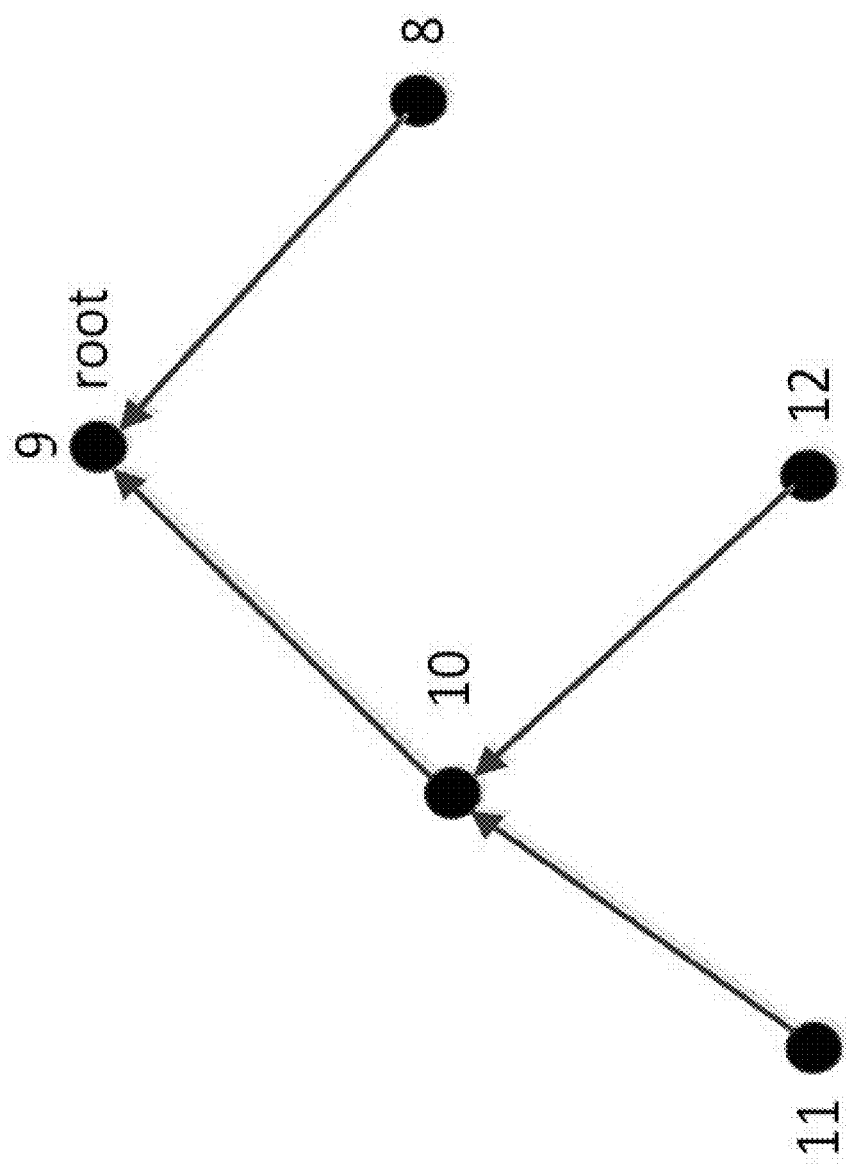
FIG. 3 is an illustration of a skeleton tree corresponding to the Steiner topology of FIG. 2.

FIG. 3 shows the skeleton tree corresponding to the Steiner topology in FIG. 2 with Node 9 being the root. Essentially, visiting the nodes in T in order from the leaves to the root gives rise to a topological order of nodes of T. That is, a node i in T is not visited until all of its children have been visited. The Steiner nodes are re-ordered by a topological order, specifically, by traversing T in level-order (i.e., breadth-first) towards the root, so that all children of a node are visited before it is visited. Without loss of generality, the reordered Steiner node sequence is denoted as 1, 2, ..., m, where m corresponds to the root of T, and let $x_{n+i} = \bar{x}_i$, i=1, 2, ..., m. Since altering the order of Steiner nodes $x_{n+i}$, i=1, 2, ..., m in the minimization of Equation (5) does not alter the optimum, Equation (5) is rewritten as $$\min_{X,\Gamma} \Psi(X, \Gamma) = \min_{\bar{x}_m, \bar{x}_{m-1}, \ldots, \bar{x}_1} \Phi(\bar{x}_m, \bar{x}_{m-1}, \ldots, \bar{x}_1), \quad (6)$$

where $$\Phi(\bar{x}_m, \bar{x}_{m-1}, \ldots, \bar{x}_1) = \bar{c}(\bar{x}_m) + \sum_{\substack{(j,m) \in E_2 \\ j \in C(m)}} \min_{\bar{x}_{jm}} c(\bar{x}_j, \bar{x}_m) + \Phi(\bar{x}_{m-1}, \ldots, \bar{x}_1). \quad (7)$$

In Equation (7), C(m) is the set of children of node m. Let $\phi(\bar{x}_i) = \bar{c}(\bar{x}_i)$ for any leaf i. Evidently, if we define $$\Phi^*(\bar{x}_m, \bar{x}_{m-1}, \ldots, \bar{x}_1) = \min_{\bar{x}_m, \bar{x}_{m-1}, \ldots, \bar{x}_1} \Phi(\bar{x}_m, \bar{x}_{m-1}, \ldots, \bar{x}_1), \quad (8)$$

then $$\Phi^*(\bar{x}_m, \bar{x}_{m-1}, \ldots, \bar{x}_1) = \min_{\bar{x}_m} \left( \bar{c}(\bar{x}_m) + \sum_{\substack{(j,m) \in E_2 \\ j \in C(m)}} \min_{\bar{x}_{jm}} c(\bar{x}_j, \bar{x}_m) + \Phi^*(\bar{x}_{m-1}, \ldots, \bar{x}_1) \right) \quad (9)$$

Problem (4) is now being converted to a dynamic programming problem. Equation (9) is the corresponding Bellman equation. To solve this, it is assumed that all Steiner nodes are grid nodes in M.

Next a directed acyclic graph (DAG) G=(V', E') based on T is constructed in the following way. Each (Steiner) node i∈T is associated with a subset $A_i$ of V', where $A_i$ are grid nodes of M and the weight on each node is $\bar{c}(x)$. It follows that $V' = \cup_{j \in S} A_j$; that is, V' is composed of m copies of grid nodes of M. For an arc e=(i, j)∈$E_2$, where j is the parent of i, a complete connection is constructed from $A_i$ to $A_j$ for G, that it, there is an arc ε=(p, q) from every p∈$A_i$ to every q∈$A_j$ in G. The cost on the arc E is defined as the minimum cost from node $x_q$ to node $x_q$, i.e., w(ε)=w(p, q)=min c($x_p$, $x_q$).

Figure 4:
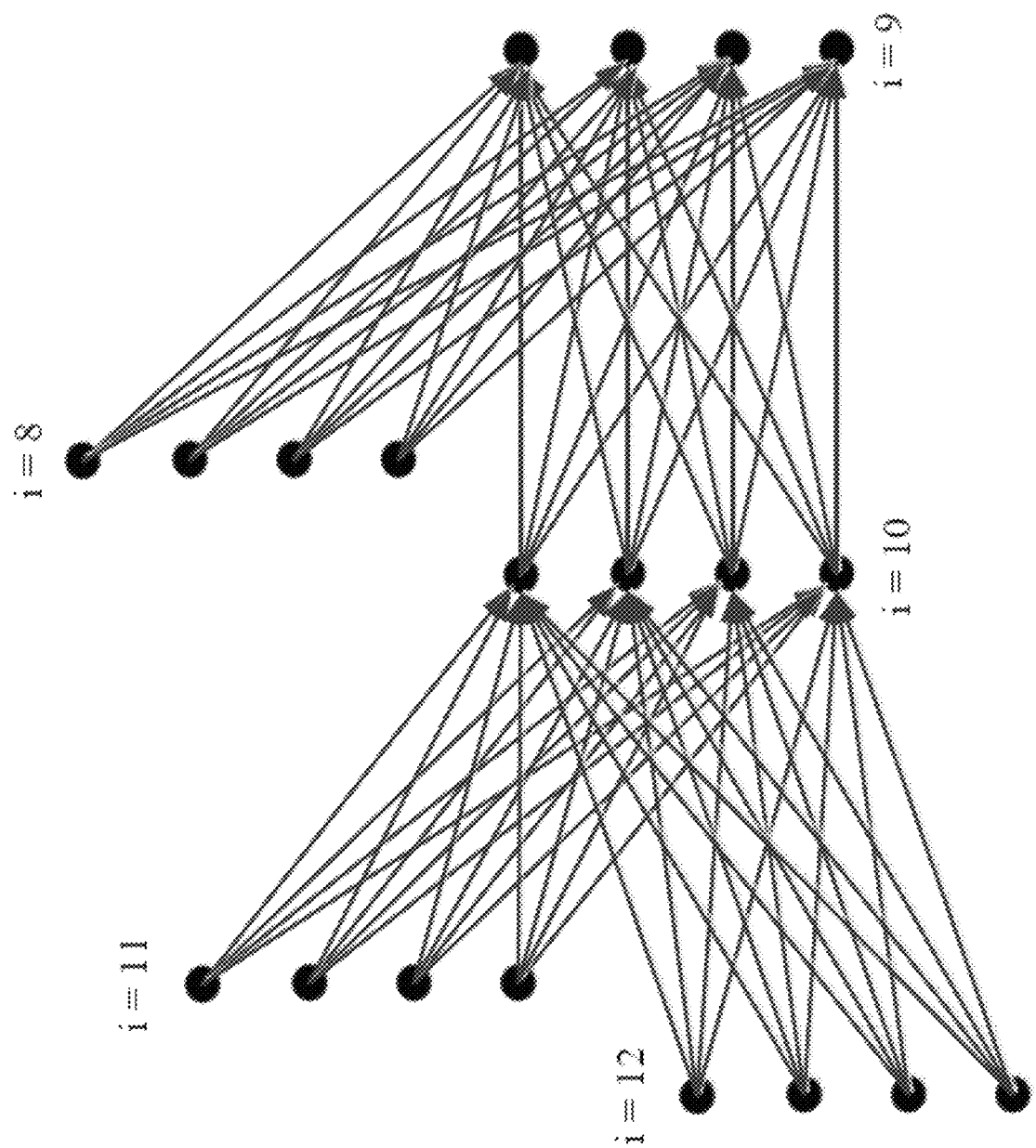
FIG. 4 is an illustration of a directed acyclic graph (DAG) G=(V', E') corresponding to the Steiner topology of FIG. 2.

FIG. 4 shows an example of the DAG G=(V', E') corresponding to the Steiner topology in FIG. 2 and the skeleton tree in FIG. 3, where the circular nodes are Steiner nodes. For a node $x_p \in A_i$, define $\varphi_p^i$ to be the following minimum cumulative cost (MCC), $$\phi_p^i = \bar{c}(x_p) + \sum_{j \in C(i)} \min_{q \in A_j} (w(x_q, x_p) + \phi_q^j), \quad (10)$$

where C(i) is the set of children of Steiner node i. From the Bellman equation (9), and the DAG modelling, an algorithm named DAG-Least-Cost-Tree is proposed that finds the tree on DAG with the minimum cost and therefore finds the coordinates of the Steiner nodes. The DAG-Least-Cost-Tree algorithm is listed as Algorithm 1. The statements in Lines 1-12 form the initialization procedure, and implementation of the Bellman equation (9) is in Lines 13-26. Once the iteration arrives at the root, in Line 27 the grid node $\hat{p}$ with MCC $\varphi_p^m$ in $A_m$ is chosen. The node $\hat{p}$ is the physical Steiner node corresponding to the root. The coordinates of the remaining Steiner nodes are derived by tracing back on G starting from $\hat{p}$. The correctness of Algorithm 1 is given in Theorem 1.

---

Algorithm 1 Algorithm for DAG-Least-Cost-Tree

Input: G = (V', E'), T with topologically sorted order.
Output: Coordinates of Steiner nodes $\bar{x}_i$, i = 1, ..., m
1:    for i = 1, ..., m do
2:        for each node $x_p \in A_i$ do
3:            if i is a leaf in T then
4:                $\phi_p^i = \bar{c}(x_p)$; $\pi(x_p) = $ NIL;
5:            else
6:                for each child j of i do
7:                    $\pi(x_p, j) = $ NIL;
8:                end for
9:                $\phi_p^i = 0$
10:            end if
11:       end for
12:   end for
13:   for i = 1, ..., m, i is not a leaf do
14:       for each node $x_p \in A_i$ do
15:           for each child j of i do
16:               $\psi = \infty$;
17:               for each node $x_q \in A_j$ do
18:                   if $\psi > \phi_q^j + w(x_q, x_p)$ then
19:                       $\psi = \phi_q^j + w(x_q, x_p)$; $\pi(x_p, j) = q$;
20:                   end if
21:               end for
22:               $\phi_p^i = \phi_p^i + \psi$;
23:           end for
24:           $\phi_p^i = \phi_p^i + \bar{c}(x_p)$;
25:       end for
26:   end for
27:   Let $\hat{p}_m = \arg\min_{x_p \in A_m} \phi_p^m$;
28:   Trace back from $\hat{p}_m$ to leaves via $\pi$;
29:   Return $x_{\hat{p}_1}, \ldots, x_{\hat{p}_m}$.

---

Theorem 1

Algorithm DAG-Least-Cost-Tree, runs on the weighted DAG G=(V', E'), and finds the coordinates of Steiner nodes of topology $\Gamma$ and therefore the least cost tree corresponding to $\Gamma$.

As mentioned above, to calculate $\bar{c}(x_j)$, FMM is firstly run for each terminal to derive the corresponding level set which gives the MCC from the terminal to each grid node in M. For each $x_j$, j∈S, $\bar{c}(x_j)$ is derived by summing all corresponding level sets over the terminals adjacent to Steiner node j. For each pair of grid nodes $x_i$, $x_j \in M$, the minimum cost is calculated from $x_i$ to $x_j$ by running FMM again. Combining with Algorithm 1 above, the complete procedure for calculating the RMT corresponding to a given Steiner topology $\Gamma$ is summarised as below.

1) Run FMM for each terminal node $x_i$, i=1, 2, ..., n to obtain the corresponding level set (distance map) $d_i$;

2) For each Steiner node i, i∈S, let $\bar{c}_i(x_j) = \Sigma_{i \in N, (i,j) \in E1} d_j(x_j)$ for each grid node $x_j \in M$ according to the given topology $\Gamma$.

3) For each pair of grid nodes $x_i$, $x_j \in M$, run FMM for calculating the minimum cost from $x_i$ to $x_j$;

4) Based on the Steiner topology $\Gamma$ and the grid nodes of M, construct the DAG G=(V', E');

5) Run DAG-Least-Cost-Tree Algorithm 1 on DAG G and find the minimum cost tree. The nodes on the minimum cost tree $x_{\hat{p}_1}, \ldots, x_{\hat{p}_m}$, are the Steiner nodes;

6) Find the geodesics $\Gamma = \{\gamma(e) | e \in E\}$ by the steepest descent method using the corresponding distance map.

The above algorithm is not limited in application to Steiner topologies. It also works for any given trunk-and-branch network topologies with tree structure, and might be of independent interest.

B. Computational Complexity Analysis

For a grid consisting of K nodes on M, the complexity of the steps 1) and 2) of the procedure listed above are O(N log(N)) and O(mK), respectively. Step 3) requires the calculation of the cost for each pair of grid nodes in M, and this has complexity $O(K^2 \log K)$. The DAG G has mK vertices and $(m-1)K^2$ arcs, so finding the least cost tree on G by using a topological order takes $O(mK+(m-1)K^2)$ operations. The computational complexity of the entire algorithm is, therefore, $O(K^2 (\log K+m-1))$. One could compute the cost for each pair of grid nodes on the manifold M before running the algorithm and store the results in a database. However, it will require at least $O(K^2)$ of memory.

C. Computational Cost Reduction

Various strategies can be used to reduce the computational cost of the proposed method.

The total cost of a SMT should be less than that of a MST. This provides an upper bound for the cost of an SMT, consequent on finding a reasonable MST. This can be done in two ways: first, calculate the complete graph on the terminals and then run Kruskal's algorithm to find an MST. This has computational complexity of $$O\left(\frac{n(n-1)}{2}K\log K + \frac{n(n-1)}{2}\log\left(\frac{n(n-1)}{2}\right)\right).$$

The second way involves a combination of the FMM and Kruskal's algorithm.

For each Steiner node i, we calculate $\tilde{d}_i = \min_{x_j \in M} \bar{c}(x_j)$. Line 19 in Algorithm 1 shows that $w(x_q, x_p)$ needs to be calculated, namely, the minimum cost from node $x_q$ to node $x_p$ for every pair of grid nodes on M. As mentioned above, they can be computed before running the algorithm and store the results in a database. By Equation (10), the computational cost of Algorithm 1 can be reduced, specifically operations from Line 17 to Line 21, as follows. For a node $x_p \in A_i$ corresponding to a Steiner node i, FMM is run with an upper bound $$b = c_{MST} - c_p - \sum_{j=i+1}^{m} \tilde{d}_j.$$

Here $c_{MST}$ is the cost of the MST, and $c_p$ is the cost of node $x_p$. Running FMM with an upper bound b means that FMM stops once the level set value on the front from the source node exceeds b. Essentially, this operation (of running FMM with an upper bound) avoids unnecessary arcs in DAG G=(V', E').

D. SMT without Knowing the Topology

If the topology is unknown, then the SMT has to be found by searching all FSTs. This is more complicated and time-consuming. Thus, instead, the B&B algorithm is adopted. One starts the B&B algorithm with an upper bound on the cost of the SMT on all the n given terminals. This upper bound can be set to +∞, or the cost of found, as above, by using Kruskal's MST algorithm on the complete graph on the terminals, or indeed any heuristically discovered tree on the n given terminals. Then one selects three of the n given terminals and designates the unique FST for the three terminals as the root node in the B&B tree. That is, the root node at depth k=0 in the B&B tree corresponds to the unique FST for the three selected terminals. The selection of the three terminals can be made arbitrarily. Given a leaf at depth k in the B&B tree that corresponds to an FST with k+1 Steiner nodes, k+3 terminals and 2 k+3 edges, branching from this leaf is carried out by adding a new terminal and creating children of this leaf with topologies derived as follows. For a given edge e=(i, j) in the FST, delete it from the FST, and add three new edges (i, s), (s, j), and (s, t), where s is the new Steiner node and it is the new terminal, generating a new FST with one more Steiner node, one more terminal and two more edges. Since there are 2 k+3 edges in the old FST, 2 k+3 new topologies will be created for this leaf. Therefore, the nodes at depth k in the B&B tree enumerate all FSTs that have k+3 terminals. It can be shown that the cost of the RMT corresponding to the new FST is always no less than that of the RMT corresponding to the old FST. That is, the above procedure of adding a new terminal cannot decrease the minimal cost of the tree. As a result, if the minimal cost of the RMT for the FST at some node in the B&B tree is no less than the upper bound, all the descendants of this node can be discarded. Otherwise, a new terminal is added to the FST corresponding to the node and one child node is generated for each edge of the FST as above. The proposed approach for RMT for a known topology is then applied to calculate the RMT for the new FST and the upper bound is updated accordingly. The algorithm proceeds until all FSTs have been considered. The SMT on the n given terminals is then the RMT with the minimum cost.

Applications

This section illustrates the application of our Algorithm 1 to scenarios based on 2D and 3D landforms. To start with, a simple case of 2D topography, where we assume uniform cost, is used to validate our proposed method. Then, the algorithm is applied to a scenario comprising real 3D landforms.

A. Application of the Algorithm to a 2D Landform

Figure 5:
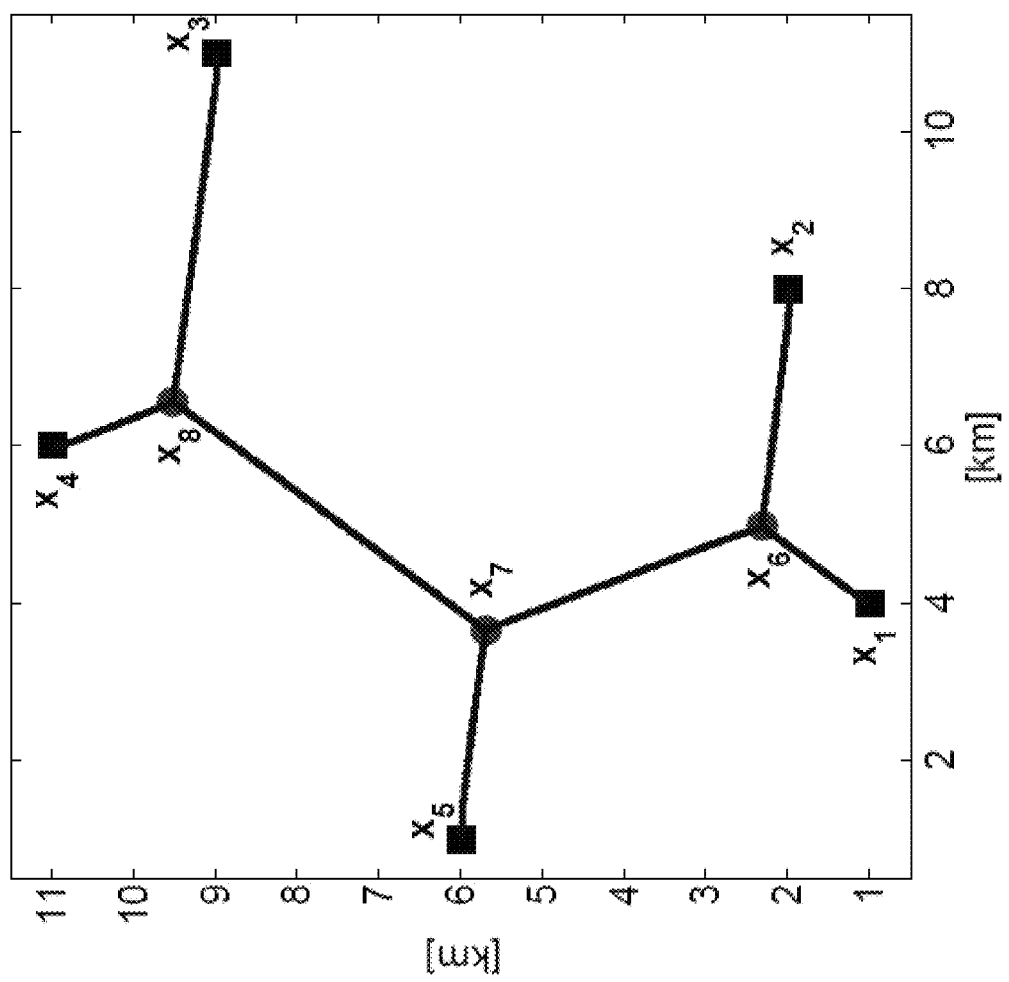
FIG. 5 is an illustration of a two-dimensional example with five terminals.

Referring to FIG. 5, in this example, it is assumed that a cable system with trunk-and-branch network topology is planned on a planar (2D) region [0.5 km, 11.5 km]×[0.5 km, 11.5 km]. There are five terminals, of which coordinates are $x_1$=(4.0 km, 1.0 km), $x_2$=(8.0 km, 2.0 km), $x_3$=(11.0 km, 9.0 km), $x_4$=(6.0 km, 11.0 km) and $x_5$=(1.0 km, 6.0 km) respectively. To apply our numerical method, both the horizontal and vertical axes are discretized into equal bins with sizes 0.02 km. It is assumed the weighted cost in this region is uniform, i.e., the weighted cost at each node is the same. The (normalized) cost δ in dollars per kilometer is assumed to be 1 in this example. In this case, the coordinates of the three Steiner nodes obtained by our proposed approach are $x_6$=(4.98 km, 2.32 km), $x_7$=(3.66 km, 5.70 km) and $x_8$=(6.56 km, 9.52 km), and the total cost of the cable system is 21.86 dollars. The angles between the edges connecting the Steiner nodes to their adjacent nodes can be calculated using the cosine rule; explicitly, $\angle x_1\ x_8\ x_2$=120.54°, $\angle x_1\ x_6\ x_7$=122.07°, $\angle x_2\ x_6\ x_7$=117.38°, $\angle x_5\ x_7\ x_6$=117.76°, $\angle x_5\ x_7\ x_8$=120.77°, $\angle x_6\ x_7\ x_8$=121.46°, $\angle x_4\ x_8\ x_7$=122.07°, $\angle x_3\ x_8\ x_7$=120.52°, $\angle x_3\ x_8\ x_4$=117.41°.

These show that the angle condition is satisfied well beyond any potential numerical error. The exact coordinates of the three Steiner nodes obtained by GeoSteiner algorithm are $x_6$=(5.04 km, 2.37 km), $x_7$=(3.66 km, 5.66 km) and $x_8$=(6.61 km, 9.55 km), and the total cost of the cable system is 21.83 dollars. Note that this 2D uniform laying cost toy example is only used to validate our algorithm, since the GeoSteiner algorithm is able to derive exact solutions more efficiently in this case.

B. Application of the Algorithm to 3D Landforms

In this section, the method described is applied to a 3D realistic scenario. The bathymetric data used here is from the Global Multi-Resolution Topography (GMRT) synthesis, a multi-resolution compilation of edited multibeam sonar data collected by scientists and institutions worldwide. The data can be downloaded from the Marine Geoscience Data System at the Lamont-Doherty Earth Observation of Columbia University.

Figure 6:
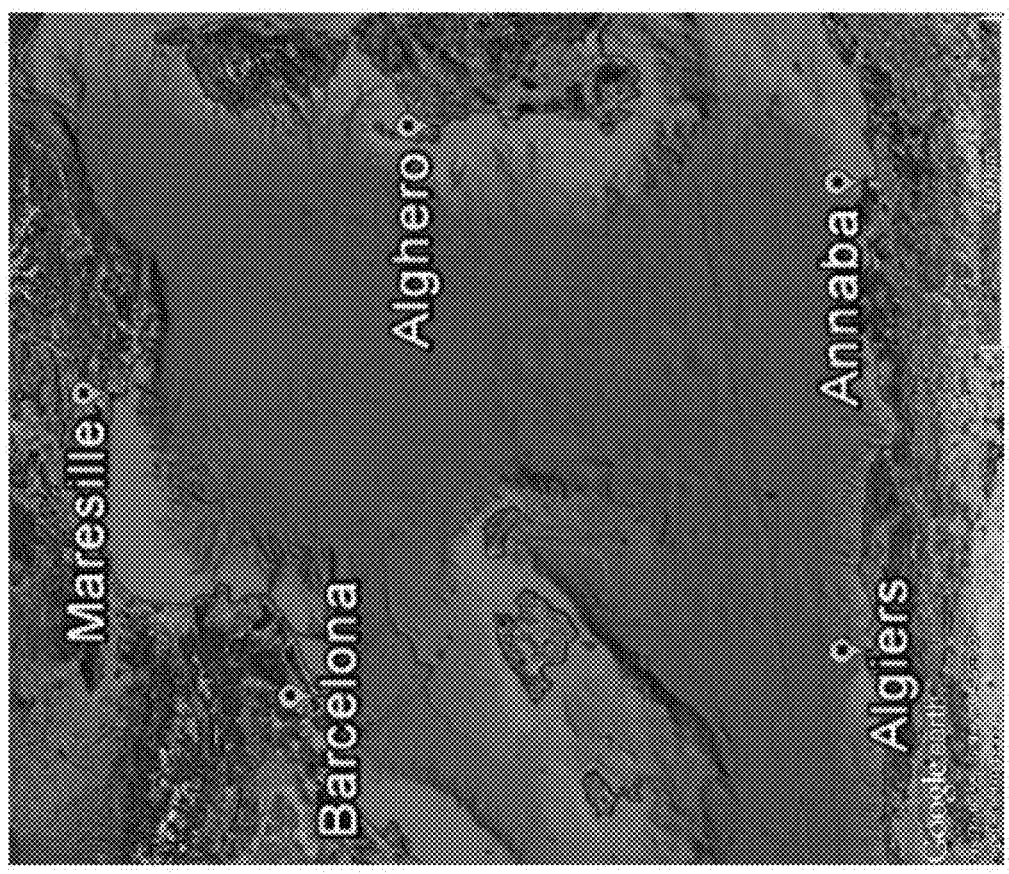
FIG. 6 is a map showing an exemplary region D.

The object region D is from the northwest corner (36.000° N, 2.000° E) to southeast corner (44.000° N, 9.000° E), which is a subregion of Mediterranean as shown by FIG. 6. The spatial resolution is 0.0704° and 0.0673° in longitude and latitude, respectively. To test the method described, firstly, cables are laid for connecting Maresille (France), Algiers (Algeria) and Annaba (Algeria). The locations of these three cities are (43.297° N, 5.359° E), (36.761° N, 3.074° E), and (36.928° N, 7.760° E) respectively. In fact, a 1,300 km submarine cable system with one branching unit, laid in 2005, called Med Cable Network is in service for the three cities, but the path data are not publicly available. Then the cable network is re-designed by connecting Barcelona (41.386° N, 2.190° E, Spain) where two branching units are installed. Lastly, we propose connecting Alghero (40.557° N, 8.312° E, Italy) with the other four cities, resulting in a submarine cable network with three branching units.

Figure 7:
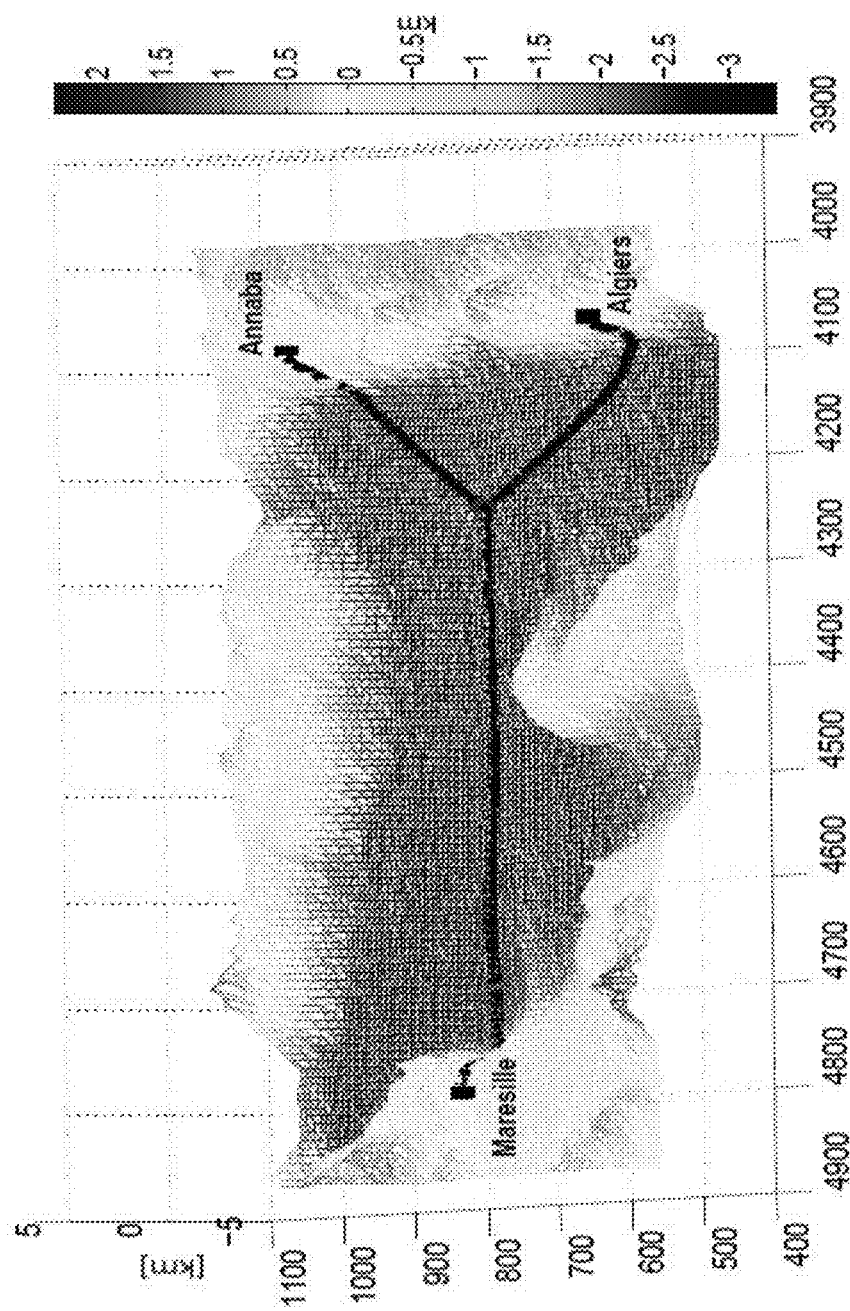
FIG. 7 is a graph showing the minimum cost cable network connecting Maresille, Algiers and Annaba.

Before calculating the SMT, a coordinate transformation is applied to convert the geographic data from latitude and longitude coordinates to Universal Transverse Mercator coordinates. Using the landform model described above, 23,562 faces are created for this region, and the triangulated manifold approximation of the landforms is shown in FIG. 7. In practice, a range of realistic restrictions have significant impact on the cable path design. For example, according to the recommendations of the International Cable Protection Committee (ICPC), the length of a cable in shallow water should be as short as possible and the cable should always be laid in the sea except for areas near landing sites. These constraints reduce the risk posed by human activities. It is preferable to lay the cable in deeper ocean. These depth constraints are enforced by imposing a modified cost function (in units of dollars $), namely, $$f(x) = \begin{cases} 20000, & \text{if } z \geq 0 \text{ km,} \\ 20000 - 20000 \times |z| & \text{if } 0 \text{ km} > z \geq -0.2 \text{ km,} \\ \dfrac{6400}{|z| + 0.2}, & \text{otherwise.} \end{cases}$$

Figure 8:
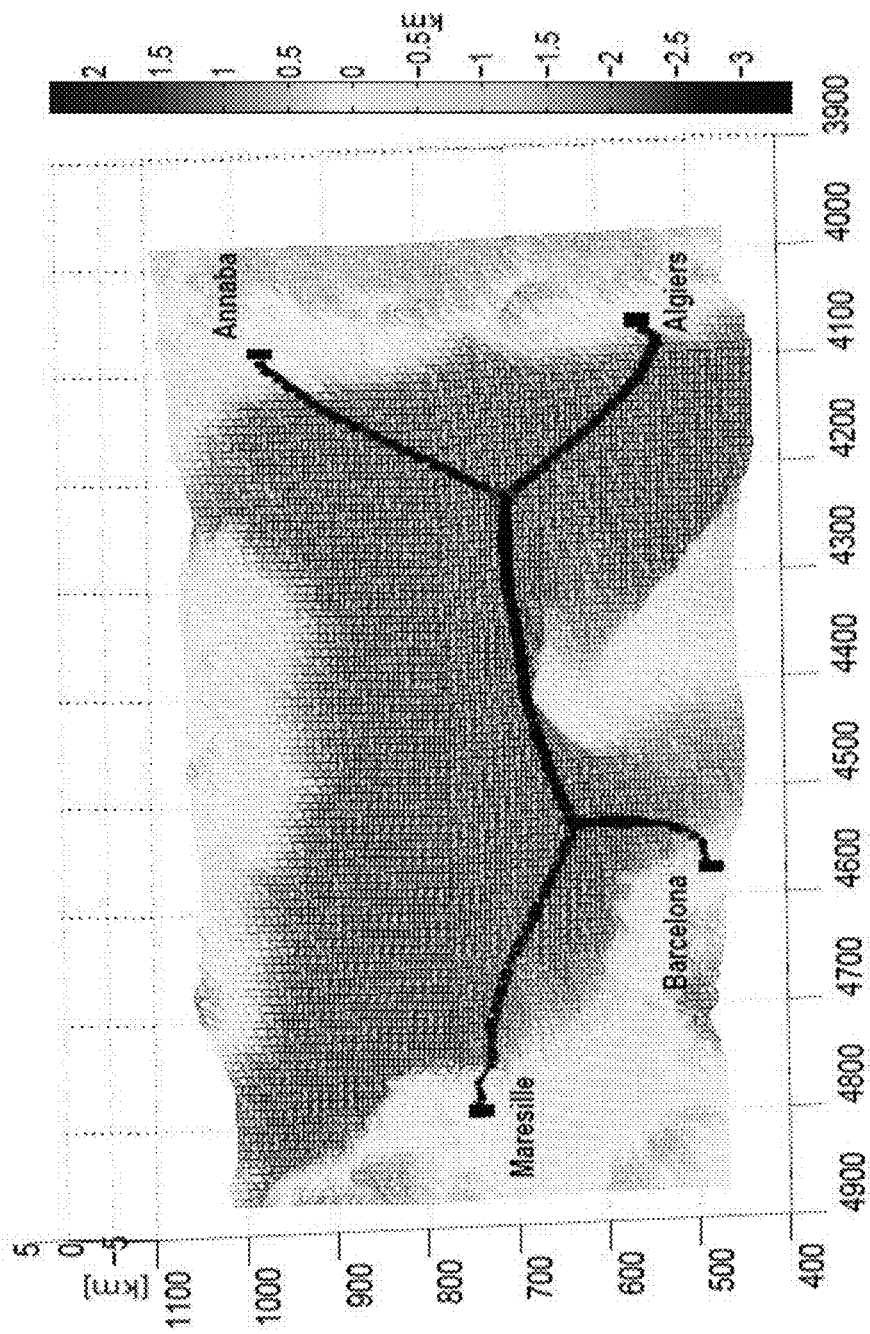
FIG. 8 is a graph showing the minimum cost cable network connecting Maresille, Algiers, Annaba and Barcelona.
Figure 9:
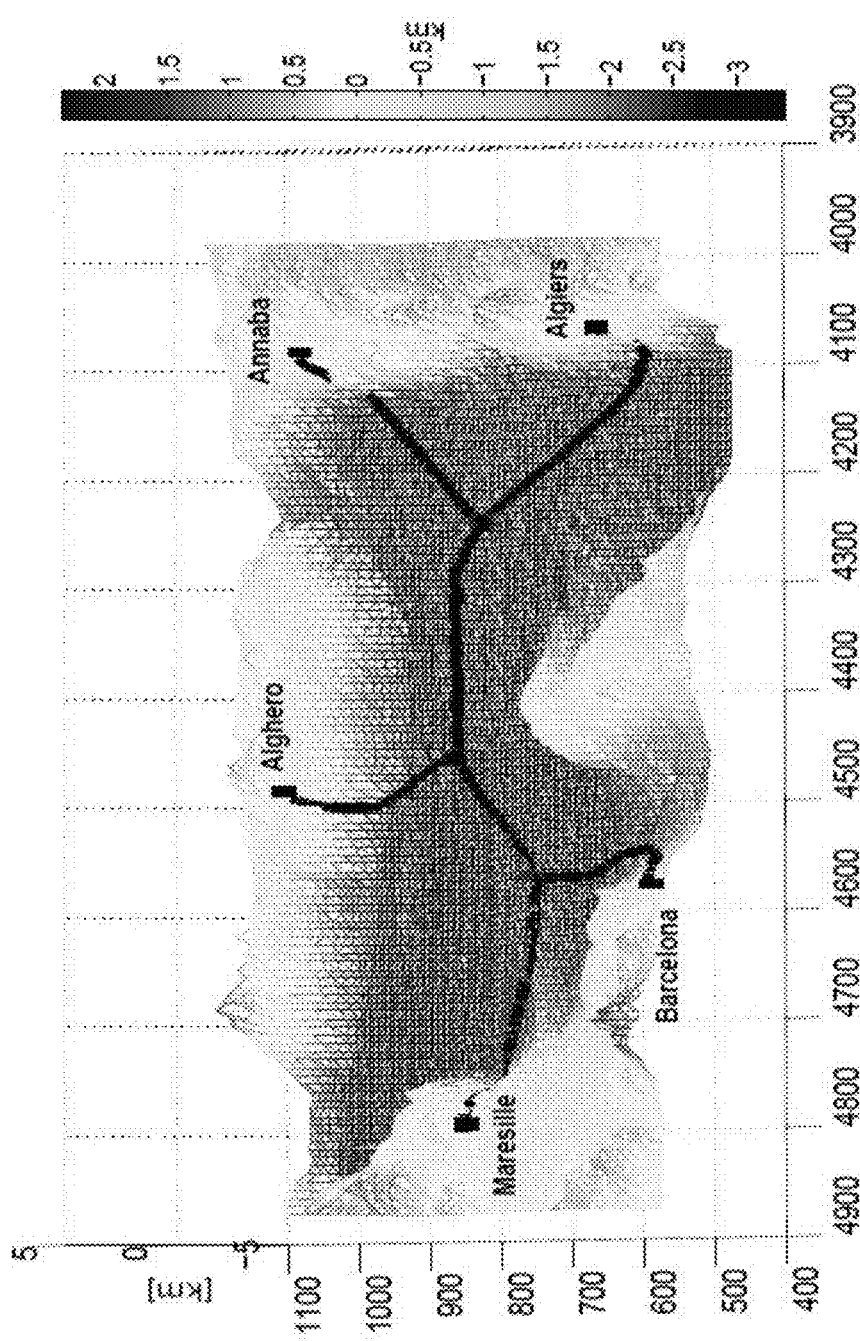
FIG. 9 is a graph showing the minimum cost cable network connecting Maresille, Algiers, Annaba, Barcelona and Alghero.

The SMTs obtained by the method described in the three cases are shown in FIGS. 7-9. In the three terminal case, a Steiner node is obtained at (4241.39 km, 732.18 km, −2.89 km) as shown by FIG. 7 and the total cost is $3,232,366 and the total length of the cable system is 1,102 km. In the four terminal case, two Steiner nodes are obtained at (4225.19 km, 683.24 km, −2.89 km) and (4530.22 km, 610.88 km, −2.66 km) as shown by FIG. 8 and the total cost is $4,283,458 and the total length of the cable system is 1,331 km. In the five terminal case, three Steiner nodes are obtained at (4242.30 km, 761.95 km, −3.17 km), (4457.84 km, 790.48 km, −2.84 km) and (4568.85 km, 675.22 km, −2.62 km) as shown by FIG. 9. The total laying cost of the cable system is $5,416,779 and the total length of the cable system is 1,601 km. Observe that the modified cost function, including a depth term, successfully limits the length of cable in shallow water.

Advantages

The method in the above embodiment has provided an optimal and computationally effective approach to solve the problem of submarine cable path planning and trunk-and-branch network topology design on the surface of the Earth taking account of laying cost and cable breakage risk. The problem has been formulated as an SMT problem on an irregular 2D manifold in $R^3$, whereby solving the problem allows the determination of the optimal path arrangement for an infrastructure link network between a plurality of geographic locations.

Advantageously, some embodiments of the present invention also incorporates B&B algorithm to accommodate unknown topologies. The invention may also be applied to the design of oil and natural gas pipelines, optical cable network, electrical power cable or distribution networks, and any other types of networks and links, and other network design problems.

Unlike existing path planning such as point-to-point path planning, the present invention solves the path planning of infrastructure links network with trunk-and-branch topology.

Exemplary System

Figure 10:
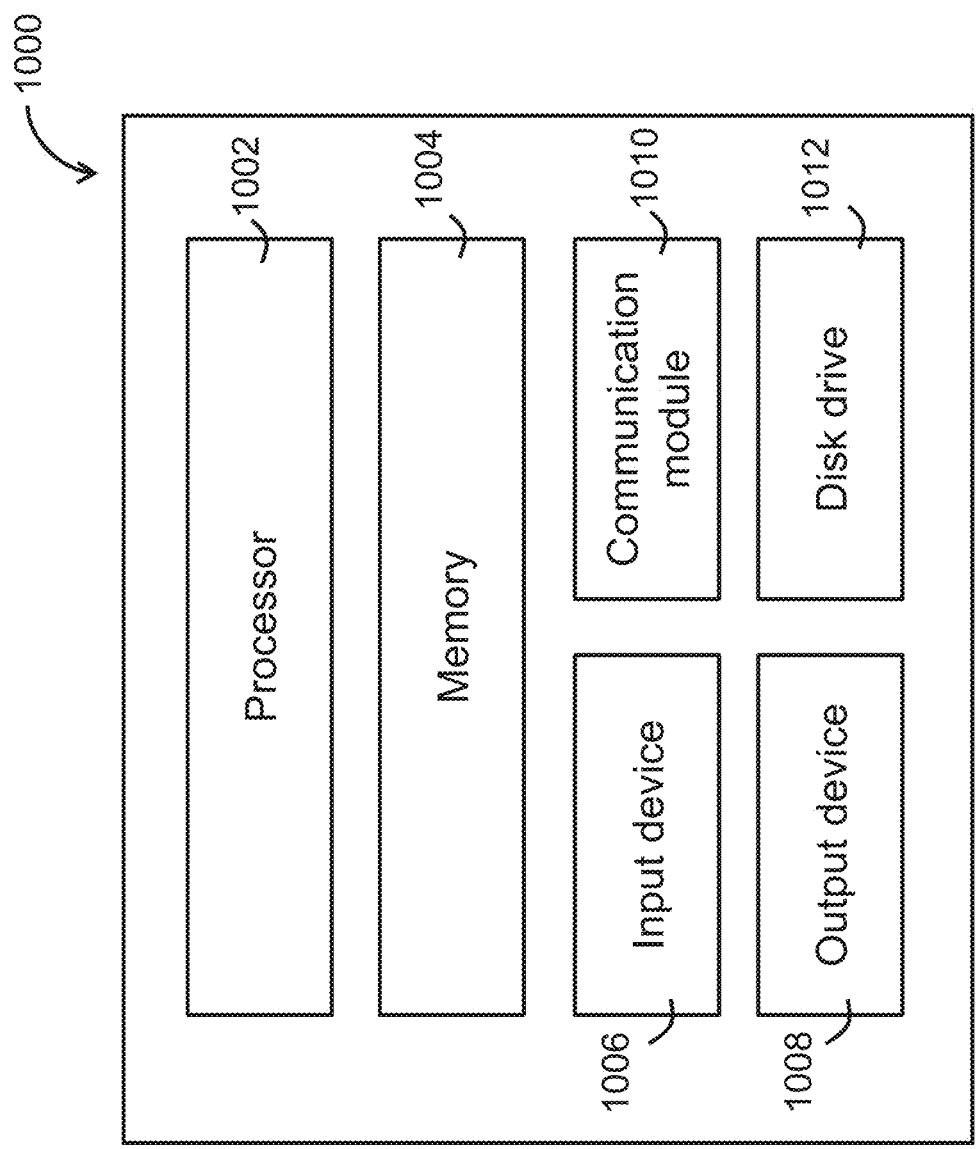
FIG. 10 is an information handling system that can be configured to operate the method in one embodiment of the invention.

Referring to FIG. 10, there is shown a schematic diagram of an exemplary information handling system 1000 that can be used as a server or other information processing systems in one embodiment of the invention for performing the method in the invention. Preferably, the server 1000 may have different configurations, and it generally comprises suitable components necessary to receive, store and execute appropriate computer instructions or codes. The main components of the server 1000 are a processing unit 1002 and a memory unit 1004. The processing unit 1002 is a processor such as a CPU, an MCU, etc. The memory unit 1004 may include a volatile memory unit (such as RAM), a non-volatile unit (such as ROM, EPROM, EEPROM and flash memory) or both. Preferably, the server 1000 further includes one or more input devices 1006 such as a keyboard, a mouse, a stylus, a microphone, a tactile input device (e.g., touch sensitive screen) and a video input device (e.g., camera). The server 1100 may further include one or more output devices 1008 such as one or more displays, speakers, disk drives, and printers. The displays may be a liquid crystal display, a light emitting display or any other suitable display that may or may not be touch sensitive. The server 1000 may further include one or more disk drives 1012 which may encompass solid state drives, hard disk drives, optical drives and/or magnetic tape drives. A suitable operating system may be installed in the server 1000, e.g., on the disk drive 1012 or in the memory unit 1004 of the server 1000. The memory unit 1004 and the disk drive 1012 may be operated by the processing unit 1002. The server 1000 also preferably includes a communication module 1110 for establishing one or more communication links (not shown) with one or more other computing devices such as a server, personal computers, terminals, wireless or handheld computing devices. The communication module 1010 may be a modem, a Network Interface Card (NIC), an integrated network interface, a radio frequency transceiver, an optical port, an infrared port, a USB connection, or other interfaces. The communication links may be wired or wireless for communicating commands, instructions, information and/or data. Preferably, the processing unit 1002, the memory unit 1004, and optionally the input devices 1006, the output devices 1008, the communication module 1010 and the disk drives 1012 are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network. A person skilled in the art would appreciate that the server 1000 shown in FIG. 10 is merely exemplary and that different servers 1000 may have different configurations and still be applicable in the invention.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. For example, the method can be applied to determine optimal laying arrangement of any infrastructure link, including fluid pipeline (e.g., oil, water, and gas pipes), electric power cables, electric data cables, optical cables, etc. The present embodiments are to be considered in all respects as illustrative, not restrictive.

The invention claimed is:

1. A method for determining an optimal path arrangement of an infrastructure link network, comprising:
  modelling a geographic terrain having a plurality of geographic locations to be connected with each other via an infrastructure link network;
  modelling each of a laying cost and a repair rate as a respective function affecting the optimal path arrangement of the infrastructure link network;
  applying a respective weighting to each of the functions to determine a minimized cost function; and
  determining, based on the determined minimized cost function, the optimal path arrangement connecting the plurality of geographical locations, the determined optimal path arrangement of the infrastructure link network includes a trunk-and-branch topology with a plurality of infrastructure links and one or more connection points connecting the infrastructure links,
wherein the determination of the optimal path arrangement comprises solving the following optimization equation:

$$\min_{X,\Gamma} \Psi(X, \Gamma) = \sum_{(i,j)\in E_1} c(x_i, x_j) + \sum_{(i,j)\in E_2} c(x_i, x_j).$$

such that a total cost of the infrastructure link network corresponding to $\Gamma$ is minimised;
  where $\Gamma$ denotes an adjacency relationship between the one or more connection points; $x_i$ and $x_j$ denote two connection points of the infrastructure link.

2. The method of claim 1, wherein the modelling of the geographic terrain comprises modelling the geographic terrain as an irregular two-dimensional (2D) manifold in three-dimensional (3D) Euclidean space.

3. The method of claim 1, wherein the determination step comprises formulating the optimal path arrangement with the trunk-and branch topology as a Steiner Minimal Tree (SMT) problem; and solving the SMT problem.

4. The method of claim 3, wherein the determination step comprises determining the number of the one or more connection points based on the minimized cost function.

5. The method of claim 4, wherein the determination step comprises determining a location of the respective connection point based on the minimized cost function.

6. The method of claim 1, wherein the infrastructure link network comprises any one of: a submarine cable network, an oil pipeline network, a natural gas pipeline network, an optical cable network, and an electrical power cable network.

7. The method of claim 1, wherein each of the one or more connection points corresponds to a location of a branching unit of a cable or of a cable landing station of a cable network.

8. The method of claim 1, wherein the determination of the optimal path arrangement further comprises:
  transforming the optimization equation to a Bellman equation; and
  applying fast marching method to solve the transformed equation for determination of the optimal path arrangement.

9. A non-transitory computer readable medium for storing computer instructions that, when executed by one or more processors, causes the one or more processors to perform a method for determining an optimal path arrangement of an infrastructure link network, comprising:
  modelling a geographic terrain having a plurality of geographic locations to be connected with each other via an infrastructure link network;
  modelling each of a laying cost and a repair rate as a respective function affecting the optimal path arrangement of the infrastructure link network;
  applying a respective weighting to each of the functions to determine a minimized cost function; and
  determining, based on the determined minimized cost function, the optimal path arrangement connecting the plurality of geographical locations, the determined optimal path arrangement of the infrastructure link network includes a trunk-and-branch topology with a plurality of infrastructure links and one or more connection points connecting the infrastructure links,
wherein the determination of the optimal path arrangement comprises solving the following optimization equation:

$$\min_{X,\Gamma} \Psi(X, \Gamma) = \sum_{(i,j)\in E_1} c(x_i, x_j) + \sum_{(i,j)\in E_2} c(x_i, x_j).$$

such that a total cost of the infrastructure link network corresponding to Γ is minimised;
where Γ denotes an adjacency relationship between the one or more connection points; $x_j$ and $x_j$ denote two connection points of the infrastructure link.

10. The non-transitory computer readable medium of claim 9, wherein the modelling of the geographic terrain comprises modelling the geographic terrain as an irregular two-dimensional (2D) manifold in three-dimensional (3D) Euclidean space.

11. The non-transitory computer readable medium of claim 9, wherein the determination step comprises formulating the optimal path arrangement with the trunk-and branch topology as a Steiner Minimal Tree (SMT) problem; and solving the SMT problem.

12. The non-transitory computer readable medium of claim 11, wherein the determination step comprises determining number of the one or more connection points based on the minimized cost function.

13. The non-transitory computer readable medium of claim 12, wherein the determination step comprises determining a location of the respective connection point based on the minimized cost function.

14. The non-transitory computer readable medium of claim 9, wherein the infrastructure link network comprises any one of: a submarine cable network, an oil pipeline network, a natural gas pipeline network, an optical cable network, and an electrical power cable network.

15. The non-transitory computer readable medium of claim 9, wherein each of the one or more connection points corresponds to a location of a branching unit of a cable or of a cable landing station of a cable network.

16. The non-transitory computer readable medium of claim 9, wherein the determination of the optimal path arrangement further comprises:
transforming the optimization equation to a Bellman equation; and
applying fast marching method to solve the transformed equation for determination of the optimal path arrangement.

17. An information handling system, comprising:
one or more processors arranged to:
model a geographic terrain having a plurality of geographic locations to be connected with each other via an infrastructure link network;
model each of a laying cost and a repair rate as a respective function affecting the optimal path arrangement of the infrastructure link network;
apply a respective weighting to each of the functions to determine a minimized cost function; and
determine, based on the determined minimized cost function, the optimal path arrangement connecting the plurality of geographical locations, the determined optimal path arrangement of the infrastructure link network includes a trunk-and-branch topology with a plurality of infrastructure links and one or more connection points connecting the infrastructure links,
wherein the determination of the optimal path arrangement comprises solving the following optimization equation:

$$\min_{X,\Gamma} \Psi(X, \Gamma) = \sum_{(i,j)\in E_1} c(x_i, x_j) + \sum_{(i,j)\in E_2} c(x_i, x_j).$$

such that a total cost of the infrastructure link network corresponding to Γ is minimised;
where Γ denotes an adjacency relationship between the one or more connection points; $x_j$ and $x_j$ denote two connection points of the infrastructure link.

18. The information handling system of claim 17, further comprising a display operably connected with the one or more processors for displaying the determined optimal path arrangement.

19. The information handling system of claim 17, wherein the one or more processors are arranged to determine the optimal path arrangement by, at least:
transforming the optimization equation to a Bellman equation; and
applying fast marching method to solve the transformed equation for determination of the optimal path arrangement.

* * * * *